FIP8102 XR 3,339,569

SEARCH ROOM

Sept.

3,339,569

PRESETTABLE DECODER

Filed May 8, 1964 SUBSTITUTE FOR MISSING XR 3 Sheets-Sheet 1

INVENTORS
PETER BAUER,
JOHN R. COLSTON &
EDWIN U. SOWERS, III

BY Hurvitz & Rose
ATTORNEYS

3339569
OR IN 137/817

INVENTORS
PETER BAUER,
JOHN R. COLSTON &
EDWIN U. SOWERS, III

BY Hurvitz & Rose
ATTORNEYS

PRESETTABLE DECODER

Filed May 8, 1964 3 Sheets-Sheet 3

INVENTORS
PETER BAUER,
JOHN R. COLSTON &
EDWIN U. SOWERS, III

BY Hurvitz & Rose
ATTORNEYS

United States Patent Office 3,339,569
Patented Sept. 5, 1967

3,339,569
PRESETTABLE DECODER

Peter Bauer, Bethesda, and John R. Colston and Edwin U. Sowers III, Silver Spring, Md.; said Bauer and said Sowers assignors to Sperry Rand Corporation, New York, N.Y., a corporation of Delaware, and said Colston assignor to Bowles Engineering Corporation, Silver Spring, Md., a corporation of Maryland Filed May 8, 1964, Ser. No. 365,996
14 Claims. (Cl. 137—81.5)

The present invention relates to pure fluid digital systems and, more particularly, to a pure fluid digital system which functions as a presettable decoder for recognizing predetermined counts in a counter, predetermined codes in various base number systems, or a particular code in baseless systems.

The present invention is particularly concerned with providing decoders which may be preset to produce a desired output signal or perform a desired output function in response to one pattern of signals of a set of variable signal patterns. Such devices are particularly useful in producing an output signal upon the receipt of a particular code arrangement of signals, such as a specific binary number in a group of binary numbers. Alternatively, the device may produce an output signal upon a counter obtaining a predetermined count or counting rate; that is, reach its maximum count. The counters may be of various base systems such as binary, trinary, decimal, hexadecimal, and the decoder may be used for detecting specific codes or detecting a specific member of a code, whether the code be in the binary, trinary, decimal, hexadecimal or other number system.

Systems of the type described above have been readily available in the electronic art for many years. However, when attempting to simulate the electronic circuits with pure fluid systems, it is found that many of the procedures employed in electronics cannot be employed in fluid systems. Thus, although overall system functions may be identical, the actual components of a pure fluid system can at best only approximate the electronic systems and, in most instances, require expensive modification along with the provision of completely new techniques and component interrelationships with respect to their electronic counterparts.

An example of the difficulties referred to above is the situation in which it is desired to connect one line of a fluid system to selected ones of several lines of another part of the system. In the electrical system, one merely employs a mechanical or electronic switch which, in the latter case, may be an element which draws current or power only when in its active state. An example of such a device would be a diode gate. In the pure fluid systems, switching is usually performed by means of a fluid device which, under the stimulus of control signals, switches a power stream to one of two or several outlet passages. The power stream is normally present at all times and thus, each switch consumes a specific amount of power at all times. It is thus necessary in the fluid systems, in order to reduce power consumption, to minimize the switching functions required to achieve a predetermined result. Also, each of the other components of fluid systems which correspond to elements in electrical systems consume power at all times and thus, the freedom that one may have in an electronic system is not available in a fluid system.

It is an object of the present invention to provide a pure fluid, presettable decoder mechanism permitting the selection of a particular arrangement of fluid signals from a wide variety of such signal arrangements; the decoder being completely compatible with the constraints placed on fluid systems.

It is another object of the present invention to provide a pure fluid, presettable decoder mechanism which may be employed to recognize one specific code of a plurality of codes regardless of the base of the code system or which may be employed as a decoder for providing an indication that a counter has acquired a predetermined count.

Still another object of the present invention is to provide a pure fluid, presettable decoder in which a decoder may comprise a counter chain presettable by the apparatus of the present invention to a specific count so as to provide an output indication when the counter has been fed a number of pulses equal to the difference between its maximum count and the preset count.

The above and still further objects, features and advantages of the present invention will become apparent upon consideration of the following detailed description of several specific embodiments thereof, especially when taken in conjunction with the accompanying drawings, wherein.

Figure 1:
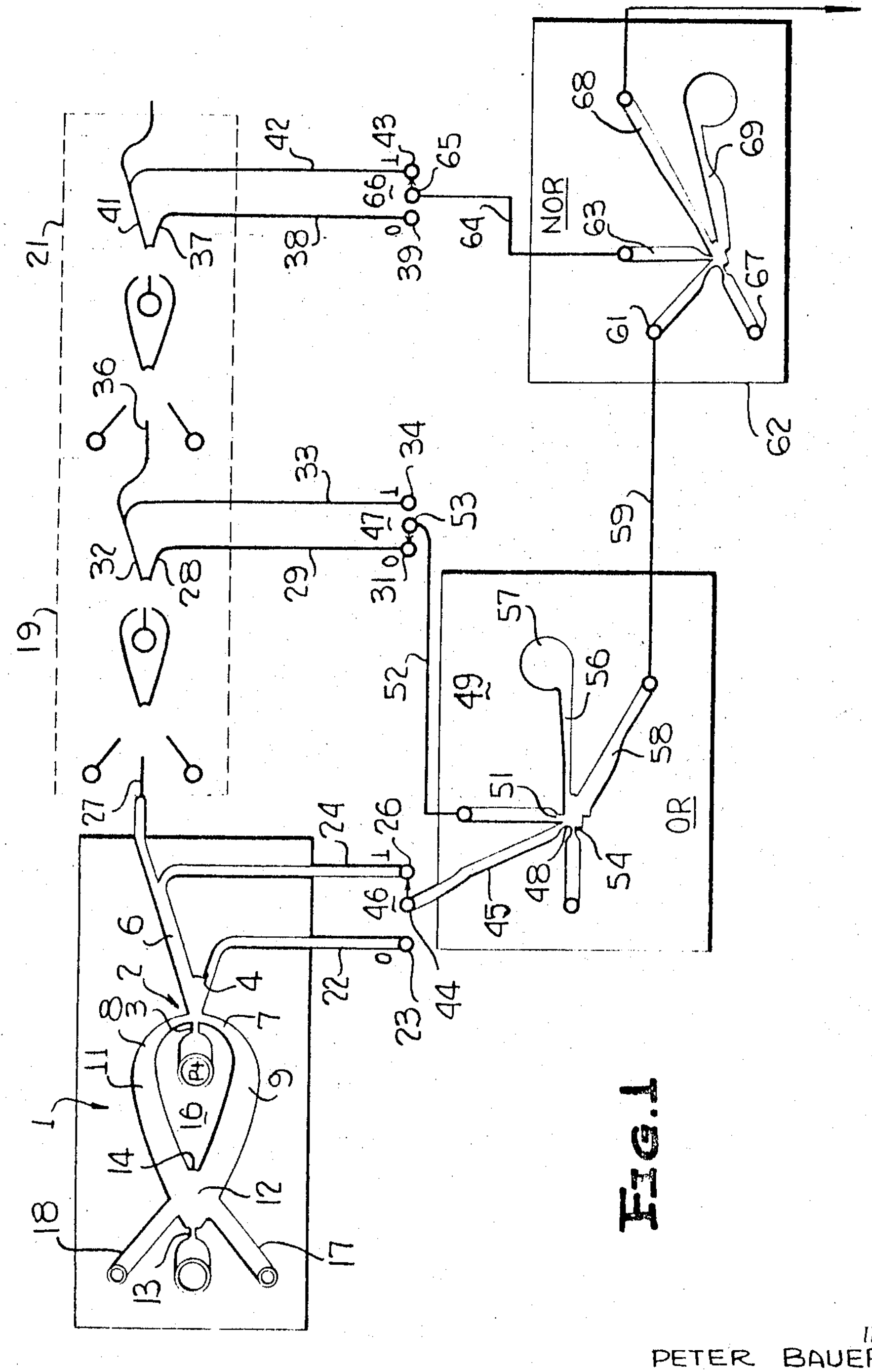
FIGURE 1 is a schematic drawing of a three-stage, binary counter and a decoder mechanism which may be preset to produce an output indication upon the counter obtaining a predetermined count.

Referring now specifically to FIGURE 1 of the accompanying drawings, the reference numeral 1 refers to a fluid pulse converter of the general type disclosed in Warren Patent No. 3,001,698. It is to be understood that other types of pure fluid counter stages may be employed; such as disclosed in U.S. Patent No. 3,114,390, the Warren patent being chosen because of simplicity of illustration. The converter comprises a pure fluid flip-flop 2 having a power nozzle 3, a "one's" output channel 4, arbitrarily selected, a "zero" output channel 6, and a pair of control nozzles 7 and 8. The nozzles 7 and 8 are connected via passages 9 and 11, respectively, to a common region 12 disposed upstream of the power nozzle 3 of the flip-flop 2. An input nozzle 13 directs fluid toward the apex 14 of an island divider 16 defined by the nozzles 7 and 8 and channels 9 and 11.

In operation, the pulse converter or pulse counter, upon the application of a fluid pulse to the nozzle 13, switches the stream issued by the nozzle 3 of the flip-flop 2 to an output channel different from the output channel to which the power stream is flowing prior to the application of the fluid pulse to the nozzle 13. For example, if the power stream is flowing to the output channel 4, the stream being quite close to the nozzle 7 reduces the pressure at this nozzle to a value which is less than the pressure subsisting at the exit orifice of the nozzle 8. Thus, a differential in pressure is established at the two ends of the flow path defined by the passages 9 and 11 and fluid flows in a counterclockwise direction around the island divider 16. Upon the application of a fluid pulse to the nozzle 13, the counterclockwise flow causes the fluid issued by the nozzle 13 to proceed through the passage 9 and nozzle 7 causing the pressure of the nozzle 7 to be raised to a value greater than the pressure along the upper line of the stream thereby causing the stream to switch its position and flow to the output channel 6. Clockwise flow is now established around the island divider 16 so that upon the application of the next pulse to the nozzle 13, the stream issuing into the chamber 12, as a result of this pulse is directed to the passage 11 and causes the stream issued by the nozzle 2 to switch back to the output passage 4.

The pulse converter is further provided with passages 17 and 18 which are directed into the region 12 from opposite sides of the nozzle 13 and are employed to provide set and reset functions for purposes to be described subsequently.

Dashed line boxes which are identified by reference numerals 19 and 21 enclose further counter stages which are identical with the counter stage designated by reference numeral 1. The illustrations within the boxes are of converters 19 and 21 and are diagrammatic in nature. The output channel 4 of counter stage 1 is connected via a passage 22 to an orifice 23 and the output channel 6 is connected via a passage 24 to an orifice 26. The output passage 6 is also connected to an input nozzle 27 of the second fluid pulse converter 19. The fluid pulse converter 19 is provided with a "one's" output passage 28 connected via a channel 29 to an output orifice 31. The fluid pulse converter 19 is provided with a second output passage 32 connected via a channel 33 to an output orifice 34. The passage 32 is also connected to an input nozzle 36 of the third fluid pulse converter 21. The "one's" output passage 37 of the fluid pulse converter 21 is connected via a channel 38 to an output orifice 39. The "zero's" output passage 41 of the converter 21 is connected via a channel 42 to an output orifice 43. The passage 41 may be further unconnected or, if desired, connected to an input nozzle of a further counter stage or a load device, if so desired.

Figure 2:
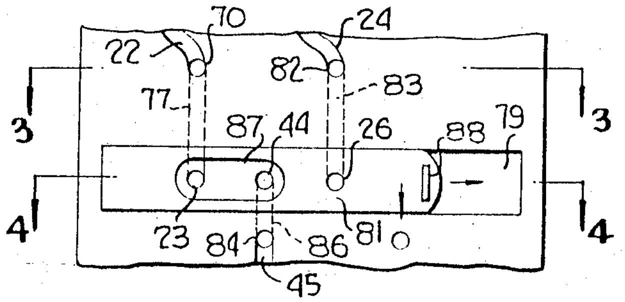
FIGURE 2 is a top partial plan view of the mechanism for preselecting one digit of the multiple digit code to be selected by the decoder mechanism of FIGURE 1.
Figure 3:
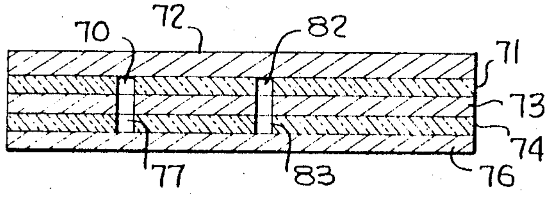
FIGURE 3 is a view in cross-section taken along line 3—3 of FIGURE 2.
Figure 4:
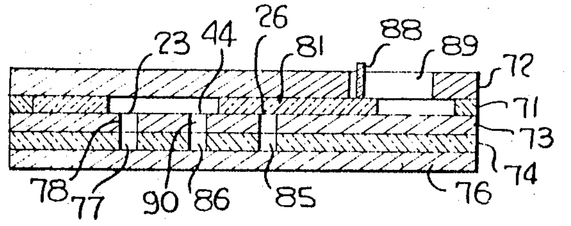
FIGURE 4 is a view in cross-section taken along line 4—4 of FIGURE 2.

The orifices 23 and 26, in conjunction with a further orifice 44, are members of a mechanical fluid switching element 46 which is described in detail in FIGURES 2 through 4. The orifice 44 may be selectively coupled to receive fluid from either of the orifices 23 or 26, as desired. The orifice 44 is connected via a passage 45 to an input nozzle 48 of a two-input or-gate 49. The gate 49 is provided with a second input nozzle 51 connected via a channel 52 to an orifice 53. The orifice 53 is incorporated in a switching element 47 so that orifice 53 may be connected to receive fluid flow from either of the orifices 31 and 34. The or-gate 49 is further provided with a power nozzle 54 which normally directs fluid to an output passage 56 connected to a fluid dump 57. The dump 57 may be returned to a sump or a negative side of the pump of the system or may be connected to ambient atmosphere. The or-gate 49 is provided with a second output passage 58 connected through a further passage 59 to an input orifice 61 of a nor-gate, schematically illustrated and designated by reference numeral 62. The nor-gate 62 has a second input nozzle 63 connected via a passage 64 to an orifice 65 of a switch 66. Switch 66 may selectively connect the orifice 65 to receive fluid from the orifice 39 or the orifice 43. The nor-gate 62 is identical with the or-gate 49 except that the functions of the output channels 56 and 58 in gate 49 are interchanged.

The operation of the or-gate 49 is such that, in the absence of application of fluid signals to either of the nozzles 48 and 51, fluid from the power nozzle 54 flows to the dump 57. If either of the nozzles 48 or 51 receives fluid, the stream issued by the power nozzle 54 is diverted to the output channel 58 and is applied via the channel 59 to the input orifice 61 of the nor-gate 62. It will be noted, that in FIGURE 1 and referring specifically to the pulse converter 1, the orifice 23 connected to the "one's" output channel 4 is designated by a "zero" while the orifice 26 connected to the "zero" output channel 6 is designated by a "one." This expedient is employed because of the utilization of or-nor logic to provide a response to a particular code. This can best be illustrated by employing a specific example of a code to be detected. The code illustrated in FIGURE 1 is 101; that is, when the counter chain has achieved a count of five, an output signal is developed in output channel 68 of the nor-gate 62. With a count 101 in the counter, the fluid from the unit 1 is applied to the channel 22; fluid from the unit 19 is applied to the channel 33; and fluid from the unit 21 is applied to the channel 38. Thus, none of the inputs to the or-nor logic receives fluid flow. The fluid issued by the power nozzle 54 of the or-gate 49 is directed to the sump 57 and thus, a fluid signal is not applied to the input nozzle 61 of the nor-unit 62. The input nozzle 63 of the nor-unit 62 also does not receive fluid so that the fluid issued by power nozzle 67 of the nor-unit 62 is directed to the output channel 68. Flow to the output channel 68 indicates the correct code has been obtained by the counter.

It is apparent that the logic requires signals of opposite sense to those generated by the counter and thus, the reversal of designations at the switches 46, 47 and 66.

The apparatus required for providing the presettable coupling of the orifice 44, for instance, to either of the orifices 23 and 26 is illustrated in FIGURES 2–4. This appartus, of course, is repeated at switch locations 47 and 66. All of the apparatus illustrated in FIGURE 1 except for the actual switching mechanisms are formed as channels in a plate designated in FIGURE 3 by reference numeral 71. A cover plate 72 is applied over the plate 71 to seal the various channels so as to define fluid flow in the system. Referring now specifically to the fluid switch the passage 22 connects with a bore 70 which extends through the plate 71 through a spacer plate 73 and into and through a second canneled plate 74 covered along its bottom by a further support plate 76. The bore 70 communicates with a channel 77 formed in the channeled plate 74, the channel 77 communicating with a bore 78 formed through plates 73 and 74. The bore 78 enters the plate 71 in a channeled region 79, the opening into the region 79 being the orifice 23. A slide 81 is disposed in the region 79 and is confined between the support plate 73 and the top or sealing plate 72.

Referring again to FIGURES 2–4, the passage 24 communicates with a bore 82 which also extends through plates 71, 73 and 74 and communicates via a channel 83 in the plate 74 with a vertical bore 85. The bore 85 enters channeled region 79 through the orifice 26. The channel 45 communicates with a bore 84 extending through the plates 73 and 74 (this not being illustrated in FIGURE 3) and extends via a channel 86 in the plate 74 into communication with a vertical passage 90 that enters channeled region 79 through the orifice 44.

The slide 81 is provided with a generally ovate aperture 87 of sufficient length along the longitudinal axis of the slide to encompass two adjacent orifices 23 and 44 or 26 and 44 at one time. In the position illustrated, the orifices 23 and 44 are interconnected through this ovate aperture 87 in the slide 81 so that, in this position of the slide, the passage 22 is connected to the passage 47. If the slide is shifted to the right, in FIGURE 2, the ovate aperture 87 provides communication between the orifices 26 and 44 so that, under these circumstances, the channel 24 is connected to the passage 47. The slide is provided with an upstanding member 88 which extends upwardly through a channel 89 in the plate 72. Thus, an operator may operate the slide 81 by merely engaging the member 88 and moving the slide to the right or left as illustrated in FIGURE 2.

It is seen from the above that, with the apparatus of the present invention, an operator may set any desired code into the decoder mechanism. In FIGURE 1, the decoder mechanism constitutes the switches 46, 47 and 66 in conjunction with the or-gate 49 and the nor-gate 62. By the simple expedient of positioning a slide 81 associated with each of the switching units, the apparatus is able to eliminate numerous active switching elements which would otherwise be required and would materially raise the power consumption of the apparatus. Also, such as arrangement lends complete flexibility to the system at a relatively low cost and with a minimum of complexity.

Figure 5:
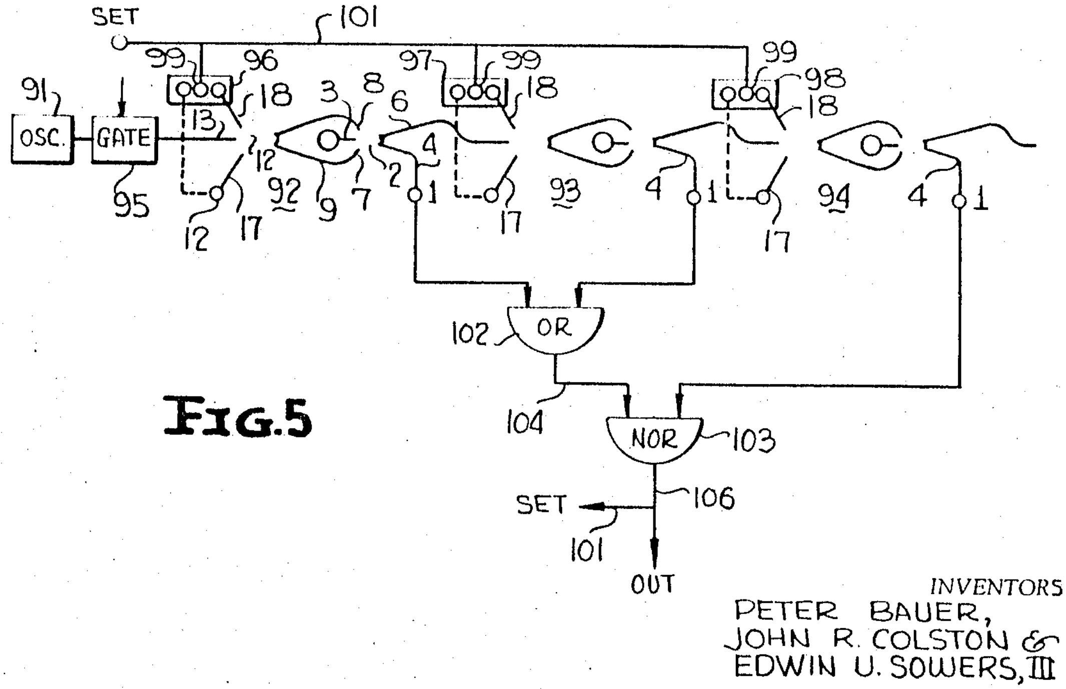
FIGURE 5 is a schematic flow diagram of a binary counter which may be set to a predetermined initial count by the mechanism of FIGURES 2 and 3 and of a decoder mechanism for determining when the counter has reached its maximum count.

Referring now specifically to FIGURE 5 of the accompanying drawings, there is illustrated a presettable counter chain which, in the particular embodiment illustrated, is a binary counter chain designed to produce an output pulse at prescribed time intervals as determined by the presetting of the counter and the frequency of a control oscillator. Specifically, the apparatus may comprise a pure fluid oscillator 91 connected to supply fluid pulses to a first counter stage 92. The apparatus is illustrated as having a total of three counter stages. The counter stages are identical with those illustrated in FIGURE 1 and, as indicated above, are connected to provide a binary count, although it is to be understood that the counter may be arranged to provide counting in other number systems; for instance, a decimal system.

In the apparatus of FIGURE 5, the elements of the pulse converted which correspond with elements of FIGURE 1 bear the same reference numerals. The selection of a particular count is achieved by presetting the counter chain to a predetermined count and indicating when the counter has counted out; that is, reached its maximum count. This apparatus makes use of the reset and preset features of the counter. When an apparatus of the type illustrated in FIGURES 1 and 5 is turned on, the streams issuing from the power nozzles of the flip-flops such as the power nozzle 3 of the flip-flop 2 may randomly assume any one of two positions. In order to set the counter to all "zero's" or some other count as desired, control passages 17 and 18 are provided for each counter stage. The channel 18 is positioned so that, upon receiving a fluid pulse, it issues fluid through the interaction region 12, the passage 9 and the control orifice 7, thus causing the power stream to be positioned to supply fluid to the output passage 6. Thus, by pulsing all of the passages 18 of the counter stages, the entire counter is set to a "zero" count. On the other hand, by pulsing a predetermined array of passages 17 and 18, any desired count may be set into the counter. This arrangement is employed in FIGURE 5. The apparatus is provided with switches 96, 97 and 98, each of which is of the type illustrated in FIGURES 2 through 4. The center orifice 99 of each of the switches is connected to a common set channel 101. By positioning the slide of each of the switches 96, 97 and 98 to an appropriate position, the orifice 99 may be selectively coupled to the passages 17 or 18 of each of the counter stages 92, 93 and 94. Thus, a predetermined initial count may be established in the counter chain. The maximum count of the chain illustrated in FIGURE 5 is eight since it is a three-stage binary counter. If the initial set in the counter is four then the system produces an output pulse for each four cycles of the oscillator 91. In this particular example, the set function is achieved by feeding back a portion of the output flow of the apparatus. The decoding logic of the apparatus includes an or-gate 102 and a nor-gate 103. The two input passages to the or-gate 102 are connected to the "one's" channels 4 of the counters 92 and 93 and one input channel to the nor-gate 103 is connected to the "one's" channels 4 of the counter stage 94. When the counter obtains a count of "zero," no fluid is supplied to either input passage of the or-gate 102 so that no fluid flow is developed or applied to its output passage 104. The two input passages to the nor-gate 103 under these circumstances do not receive fluid flow and therefore an output signal is developed on its output lead 106 indicating that the counter chain has counted out. A part of the fluid delivered to the channel 106 is applied to the channel 101 to reset the counter to its initial count so that the cycle may repeat itself continuously.

There is a distinct advantage to the type of system illustrated in FIGURE 5 in that the flow to the "zero" channel of the counter stages is not utilized for output purposes. Referring for the moment to FIGURE 1, it will be noted that the "one's" output passages are connected only to the decoding logic while the "zero's" passages not only supply the decoding logic but also are connected to supply fluid to the next stage of the counter. Thus, the level of signals available to the decoding logic is different depending whether the "one's" or the "zero's" output channel is being sensed. These undesirable effects may be overcome by including a stage of amplification in the "zero's" output channel to the decoding logic. However, this arrangement requires a further power nozzle and therefore, further power consumption. The arrangement of FIGURE 5 does away with this difficulty by including the presetting mechanisms or units in the presetting section of the counter. This arrangement is satisfactory where one is attempting to recognize a specific count but, where it is desired to employ the decoding mechanism to recognize a specific code which may be received from sources other than a counter, such an arrangement is not practical.

Figure 6:
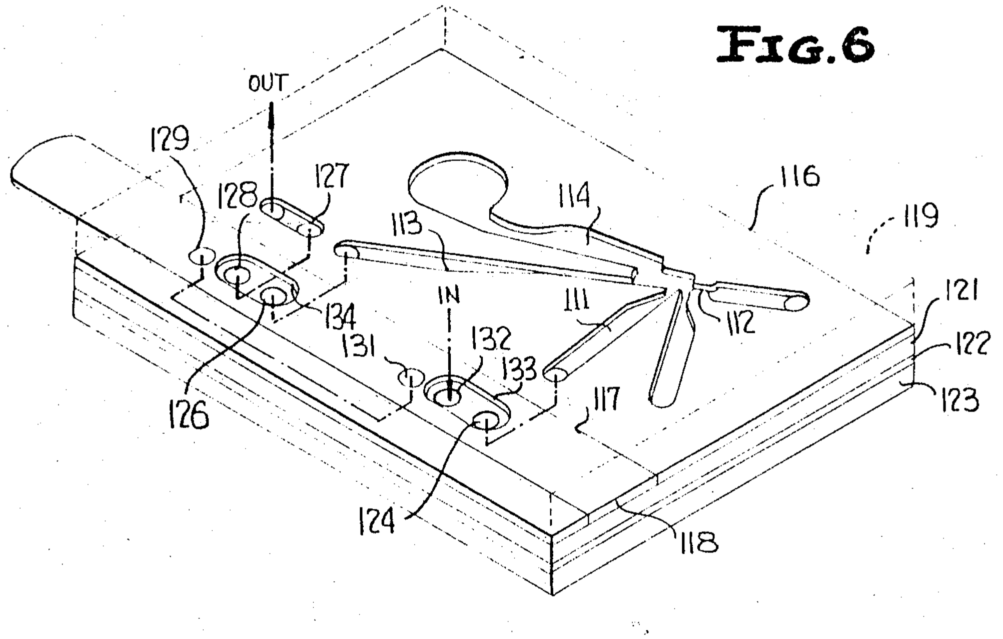
FIGURE 6 is a perspective view of a mechanically presettable inverter for use in a system such as the system of FIGURE 7.

It is therefore an important feature of the present invention to provide a selection mechanism which may be employed with any type of decoding apparatus and which does not encounter the difficulties encountered in the apparatus of FIGURE 1. Such a selection mechanism is illustrated in FIGURE 6 of the accompanying drawings. The mechanism of FIGURE 6 employs basically a nor-circuit as a pulse inverter and, as such, employs only one of the input channels to the apparatus. The inverter circuit includes an input nozzle 111, a power nozzle 112, a signal output channel 113 and a dump channel 114. Normally, flow from the power nozzle 112 proceeds to the output channel 113 but, in the presence of an input pulse, flow is diverted to the dump output channel 114. Thus, a fluid output signal is derived in the absence of an input pulse and is terminated in the presence of an input pulse, this being a standard inverter function.

The apparatus of FIGURE 6, however, is employed to provide a presettable function for a decoder apparatus and, as such, is adapted to selectively couple a signal to the inverter so as to provide an inverted output signal or to by-pass the inverter so as to provide an in-phase output signal; that is, an output signal whenever a fluid pulse is applied to the apparatus. Thus, the apparatus permits one to insert or withdraw the inverter of FIGURE 6 from the specific circuit in which it is employed.

The inverter is formed as a plurality of channels in the upper surface, as illustrated in FIGURE 6, of a plate 116. The plate is provided with a longitudinally extending channel 117 in which is located a slide 118. A cover plate 119 is provided over the plate 116 to seal the channels in the plate 116 and to retain the slide 118 in position. The plate 119 is not illustrated in FIGURE 6 so as not to obscure the view of the top plate 116 but dashed lines are employed to indicate its location. The apparatus of FIGURE 6 further comprises plates 121, 122 and 123. The plate 121 is a spacer having appropriate holes drilled therein to provide communication between passages formed in the plate 116 and cross-over passages formed in the plate 122. Thus, the control nozzle 111 communicates with an orifice 124 located in the slide region of the plate 116 by means of appropriate bores through plate 121 and passages formed in the plate 122. These bores and passages are illustrated by broken lines in FIGURE 6. Similarly, the output passage 113 communicates with an orifice 126 formed in the slide region of the plate 116 by means of vertical bores through the plate 121 and a passage formed in the plate 122. An output orifice 127 of the mechanism is formed in the plate 116 and communicates with an orifice 128 formed in the plate 116 in the region of the slide 118. A further orifice 129 is formed in the channeled region 117 of the plate 116 in the region of the orifice 128. The orifice 129 communicates with an orifice 131 formed in the plate 116 adjacent the orifice 124. Again, communication is by means of bores through the plate 121 and the passage in the plate 122. Input signals are applied to an orifice 132 located in the region 117 between the orifices 124 and 131.

Slide 118 is provided with two ovate apertures 133 and 134, the aperture 133 being large enough to encompass two adjacent orifices 124–132 or 131–132 and the aperture 134 being large enough to encompass two adjacent orifices 126–128 or 128–129. Communication with the orifices 127, 132 and the power nozzle 112 may be made to further portions of the circuitry also by bores through the plate 121 and channels formed in the plate 122.

In operation, and assuming the position of the slide 118 illustrated in FIGURE 6, input signals are coupled through the inverter to the output passage 127. Specifically, the input orifice 132 is connected by means of the aperture 133 in the slide 118 to the orifice 124 which, in turn, is connected to the input nozzle 111 of the inverter. Concurrently, the output channel 113 of the inverter is coupled through the aperture 134 in the slide to the output orifice 127. Thus, with the slide in the position illustrated in FIGURE 6, the inverter is connected to the circuit. If the slide is now moved to the left as illustrated in FIGURE 6 so that the aperture 133 in the slide 118 provides coupling between the orifices 131 and 132 and the aperture 134 couples the orifices 128 and 129, the inverter is removed from the circuit. Under these circumstances, fluid flow is from the orifice 132 through the aperture 133 to the orifice 131, thence to the orifice 129, orifice 128 and output orifice 127.

Figure 7:
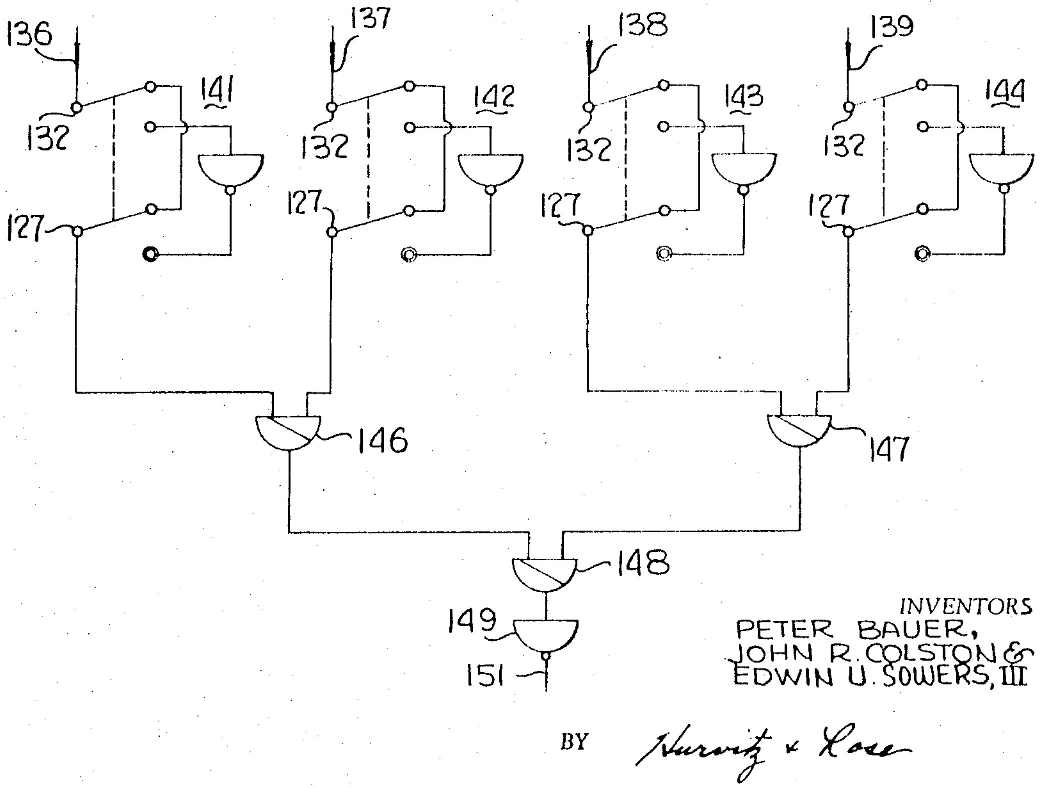
FIGURE 7 is a schematic flow diagram of a presettable decoder employing the selection apparatus of FIGURE 6.

Referring now to FIGURE 7 of the accompanying drawings, there is illustrated a decoding mechanism employing the apparatus of FIGURE 6. The decoder is provided with four input channels 136, 137, 138 and 139. These passages may receive fluid from a coding matrix, a binary, trinary, decimal or hexadecimal counter system or any other source of coded or baseless signals. The decoder is adapted to provide an output whenever the fluid signals on the leads 136 through 139 conform to a specific code which has been set into the mechanism by means of settings of the slides 118 of various units of the type illustrated in FIGURE 6. More particularly, the passage 136 is coupled to a selector mechanism 141, and the passages 137 through 139 are connected, respectively, to selector mechanisms 142 through 144, each of which is of the type illustrated in FIGURE 6. The output orifice 127 of the unit 141 is connected to a first input nozzle of an or-gate 146 while the output orifice 127 of the unit 142 is connected to a second input nozzle of the or-unit 146. Output orifices 127 of the selector units 143 and 144 are connected, respectively, to the two input passages or nozzles of a second or-gate 147. The output channels of the or-units 146 and 147 are connected, respectively, to the two input channels or nozzles of a further or-unit 148 and the output channel of the unit 148 is connected through an inverter 149 to an output channel 151 for the decoding unit.

The or-gate 148 develops no output flow to the unit 149 when there is no flow from any of the output orifices 127 of all units 141 through 144. Thus, an output flow is developed in the output channel 151 only under these circumstances; that is, when no flow is developed at any of the orifices 127. In the particular example of the settings of FIGURE 7, all of the inverters are bypassed so that an output signal is developed when no flow is developed on any of the input leads 136 through 139. In the binary system, this may indicate a code of 1111 or 0000. An output signal may be developed for any desired code by merely switching the pattern of inverters in the circuit. Thus, assuming that it is desired to recognize a binary ten, the units 141 and 143 are switched so that the inverters incorporated therein are included in the circuit. Under these circumstances, assuming that the lead 136 carries the most significant digit, fluid flow is supplied to the passages 136 and 138. However, since the inverters are included in the circuit, no flow is developed at the orifices 127 of the units 141 and 143. The units 142 and 144 remain as illustrated in the figure and thus, since no flow is developed in the passages 137 and 139, no flow is developed in the corresponding orifices 127.

As indicated above, the leads 136 through 139 may be coupled to any source of coded information whether this source be a counter, a shift register or the output from some coding device. The source of signals is immaterial to the operation of the apparatus. Also, the type of code employed is unimportant as far as operation is concerned although different codes may require different arrangements of or, or-nor, or nor logic.

While we have described and illustrated several specific embodiments of our invention, it will be clear that variations of the details of construction which are specifically illustrated and described may be resorted to without departing from the true spirit and scope of the invention as defined in the appended claims.

What we claim is:

1. A presettable, pure fluid decoding mechanism comprising an array of pure fluid pulse converter stages each having a first and a second input channel and at least first and second output channels, means for applying a distinct unit of a code each to a different one of said converter stages, decoding means connected to various ones of said output channels for producing an output signal when a specific code is presented to said array of converter stages, said decoding means including further means for varying the code to which said decoding means is responsive, said further means comprising a fluid switch having at least one fluid input passage, and at least one fluid output passage and an operable slide movable between first and second positions, said slide including aperture means for directly interconnecting said input passage and said output channel in said first position only.

2. The combination according to claim 1 wherein said fluid switch further comprises a second input passage, said slide interconnecting said second input passage and said output passage when in said second position.

3. The combination according to claim 2, wherein said decoding means has a separate fluid switch for each of said converter stages, each of said input passages of each of said fluid switches being connected to a different one of said output channels of its associated converter stage, and fluid logic means for producing an output fluid pulse when all of said output passages of said fluid switches have the same signal conditions established therein.

4. The combination according to claim 1 wherein said fluid switch further comprises a second output passage, said slide interconnecting said second output passage and said input passage in said second position, each fluid switch having a different one of said output passages connected to a different input channel of the same converter stage, there being one said fluid switch for each of said converter stages.

5. The combination according to claim 1 wherein said fluid switch comprises a fluid nor-circuit having an input flow path and an output flow path, said slide in said second position connecting said input passage and said output passage of said switch to said input flow path and said output flow path, respectively, of said nor-circuit.

6. A presettable pure fluid decoding mechanism comprising:

an array of pure fluid amplifiers;

means for applying a distinct unit of a coded fluid signal each to a different one of said amplifiers;

decoding means connected to various ones of said pure fluid amplifiers for producing a fluid output signal in response to a specific code applied to said array of pure fluid amplifiers;

and adjustment means for varying the specific code which produces said fluid output signal; said adjustment means comprising a plurality of fluid passages and switch means for selectively varying fluid flow between said passages.

7. The combination of claim 6 wherein each pure fluid amplifier of said array of pure fluid amplifiers includes output signal means, said adjustment means varying fluid flow connections between said output signal means and said decoding means.

8. The combination of claim 7 wherein said array of pure fluid amplifiers includes a binary counter, and wherein said means for applying a coded fluid signal comprises a source of fluid pulses to be counted.

9. The combination of claim 8 wherein said decoding means comprises pure fluid logic circuit means and said adjustment means comprises a plurality of two-position switch means, and further comprising means for connecting said switch means for providing a fluid flow path from respective ones of said various output signal means to said logic circuit means when said switch means are in one position and from other ones of said various output signal means to said logic circuit means when said switch means are in their other position.

10. The combnation of claim 9 wherein said array of pure fluid amplifiers each includes a plurality of input means, and further comprising a fluid signal source and means connecting said adjustment means between said fluid signal source and various ones of said plurality of input means.

11. The combination of claim 10 wherein said adjustment means comprises a plurality of two-position fluid switch means for providing a fluid flow path from said fluid signal source and specified ones of said various input means when said fluid switch means is in one position and from said fluid signal source to other ones of said various input means when said fluid switch means is in a second position.

12. The combination of claim 11 wherein said array of pure fluid amplifiers comprises a binary counter, and wherein there is provided means for applying source of fluid pulses to said counter to be counted thereby, whereby said fluid switch means produces pre-set forced counts in said counter.

13. The combination of claim 6 wherein said adjustment means is connected between said means for applying a fluid signal, and said array of fluid amplifiers.

14. The combination of claim 13 wherein said adjustment means comprises a plurality of four-pole, two-position fluid switch means associated with respective ones of said array of pure fluid amplifiers for providing a fluid flow path between said means for applying a fluid signal and said decoding means when said switch means is in a first position and for connecting said means for applying a fluid signal and said decoding means in series with said respective ones of sad fluid amplifiers when said switch means is in a second position.

References Cited

UNITED STATES PATENTS

| | | | |
|---|---|---|---|
| 2,252,141 | 8/1941 | Seidel et al. | 137—625.48 |
| 2,858,851 | 11/1958 | Holt | 137—625.48 X |
| 3,057,375 | 10/1962 | Etter | 235—201 X |
| 3,057,551 | 10/1962 | Etter | 137—81.5 X |
| 3,075,548 | 1/1963 | Horton | 137—81.5 X |
| 3,155,825 | 11/1964 | Boothe | 235—201 X |
| 3,191,858 | 6/1965 | Sowers | 235—201 X |
| 3,229,705 | 1/1966 | Norwood | 137—81.5 |

OTHER REFERENCES

"Fluid Logic Shift Register With Intermediate Stages," H. R. Grubb, I.B.M. Technical Disclosure Bulletin, June 1963, vol. 6, No. 1, pp 24, 25

M. CARY NELSON, *Primary Examiner.*

S. SCOTT, *Assistant Examiner.*